US009628796B2

(12) United States Patent
Rabii et al.

(10) Patent No.: US 9,628,796 B2
(45) Date of Patent: Apr. 18, 2017

(54) SYSTEM AND METHOD TO OPTIMIZE VIDEO PERFORMANCE IN WIRELESS-DOCK WITH ULTRA-HIGH DEFINITION DISPLAY

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Shivakumar Balasubramanyam, San Diego, CA (US); Fawad Shaukat, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 142 days.

(21) Appl. No.: 14/279,224

(22) Filed: May 15, 2014

(65) Prior Publication Data

US 2015/0334388 A1    Nov. 19, 2015

(51) Int. Cl.
*H04N 19/103*       (2014.01)
*H04N 19/156*       (2014.01)
(Continued)

(52) U.S. Cl.
CPC ......... *H04N 19/103* (2014.11); *H04L 65/602* (2013.01); *H04L 65/80* (2013.01);
(Continued)

(58) Field of Classification Search
CPC ........... H04N 19/40; H04N 21/234363; H04N 19/156; H04N 7/0125; H04N 19/103;
(Continued)

(56) References Cited

U.S. PATENT DOCUMENTS 6,043,837 A * 3/2000 Driscoll, Jr. ......... H04N 5/2628
348/36
2006/0203080 A1  9/2006 Lessing et al.
(Continued)

FOREIGN PATENT DOCUMENTS

WO    WO-2012154157 A1    11/2012
WO    WO-2013094640 A1    6/2013

OTHER PUBLICATIONS

International Search Report and Written Opinion—PCT/US2015/028464—ISA/EPO—Jul. 8, 2015.

*Primary Examiner* — Obafemi Sosanya
(74) *Attorney, Agent, or Firm* — Knobbe Martens Olson & Bear, LLP

(57) ABSTRACT

Methods, devices, and computer program products for using raw bitstreams and lossless distributed source coded (DSC) video to optimize video performance in wireless dock with ultra-high definition displays. In one aspect, a method of transmitting a video stream from a transmitting device to a wireless video display is described. The method includes determining a resolution of the wireless video display and a native resolution of a video stream, as well as a connection speed between the transmitting device and the wireless video display. Based on this information, the method selects a video compression format, choosing between raw video, DSC video, and high-efficiency video coded video. The method further transmits the video stream in the selected video compression format from the transmitting device to the wireless video display.

30 Claims, 10 Drawing Sheets

| Resolution Label/Code | H_RES (# of Pixels) | V_RES (# of Pixels) | Pixel-RES (BPP) | Frame Raw BW (MbpS) | Uncompressed Bitstream BW (MbpS @60FPS) | HEVC Compressed Video Bitrate | |
|---|---|---|---|---|---|---|---|
| | | | | | | Minimum Sustained_Rate | Peak_Rate (@ Splice-Point) |
| VGA | 640 | 480 | 16 | 5 | 295 | 0.38 | 14.37 |
| SDTV | 720 | 480 | 16 | 6 | 332 | 0.42 | 16.17 |
| | 800 | 480 | 16 | 6 | 369 | 0.47 | 17.97 |
| SVGA | 800 | 600 | 16 | 8 | 461 | 0.59 | 22.46 |
| | 840 | 480 | 16 | 6 | 387 | 0.49 | 18.87 |
| | 854 | 480 | 16 | 7 | 394 | 0.50 | 19.18 |
| 2XVGA | 960 | 640 | 16 | 10 | 590 | 0.75 | 28.75 |
| | 1024 | 600 | 16 | 10 | 590 | 0.75 | 28.75 |
| XGA | 1024 | 768 | 16 | 13 | 755 | 0.96 | 36.80 |
| | 1024 | 800 | 16 | 13 | 786 | 1.00 | 38.33 |
| | 1024 | 800 | 16 | 13 | 786 | 1.00 | 38.33 |
| XGA+ | 1152 | 864 | 16 | 16 | 956 | 1.22 | 46.57 |
| HDTV | 1280 | 720 | 16 | 15 | 885 | 1.13 | 43.12 |
| WXGA | 1280 | 768 | 16 | 16 | 944 | 1.20 | 45.99 |
| SXGA | 1280 | 800 | 16 | 16 | 983 | 1.25 | 47.91 |
| SXGA (UVGA) | 1280 | 960 | 16 | 20 | 1180 | 1.50 | 57.49 |
| SXGA | 1280 | 1024 | 16 | 21 | 1258 | 1.60 | 61.33 |
| WXGA | 1360 | 768 | 16 | 17 | 1003 | 1.28 | 48.87 |
| | 1366 | 768 | 16 | 17 | 1007 | 1.28 | 49.08 |
| | 1400 | 1050 | 16 | 24 | 1411 | 1.80 | 68.78 |
| WSXGA | 1440 | 900 | 16 | 21 | 1244 | 1.59 | 60.64 |
| HD+ | 1600 | 900 | 16 | 23 | 1382 | 1.76 | 67.38 |
| UXGA | 1600 | 1200 | 16 | 31 | 1843 | 2.35 | 89.83 |
| WSXGA+ | 1680 | 1050 | 16 | 28 | 1693 | 2.16 | 82.53 |
| FullHDTV (4:2:0) | 1920 | 1088 | 12 | 25 | 1504 | 1.92 | 73.30 |
| FullHDTV (4:2:2) | 1920 | 1088 | 16 | 33 | 2005 | 2.56 | 97.74 |
| FullHDTV | 1920 | 1088 | 36 | 75 | 4512 | 5.75 | 219.91 |
| WUXGA | 1920 | 1200 | 36 | 83 | 4977 | 6.35 | 242.55 |
| WQXGA | 2560 | 1600 | 36 | 147 | 8847 | 11.28 | 431.20 |
| 4K-UltraHDTV | 3840 | 2160 | 48 | 398 | 23888 | 30.46 | 1164.24 |
| 4K-Full-Aperture | 4096 | 3112 | 48 | 612 | 36711 | 46.80 | 1789.19 |

(51) Int. Cl.
*H04N 19/40* (2014.01)
*H04N 19/184* (2014.01)
*H04N 7/01* (2006.01)
*H04L 29/06* (2006.01)
*H04N 21/436* (2011.01)
*H04N 21/4363* (2011.01)
*H04N 21/442* (2011.01)
*H04N 21/462* (2011.01)
*H04N 21/6379* (2011.01)

(52) U.S. Cl.
CPC ......... *H04N 7/0117* (2013.01); *H04N 19/156* (2014.11); *H04N 19/184* (2014.11); *H04N 19/40* (2014.11); *H04N 21/43615* (2013.01); *H04N 21/43637* (2013.01); *H04N 21/44209* (2013.01); *H04N 21/4621* (2013.01); *H04N 21/6379* (2013.01)

(58) Field of Classification Search
CPC ........... H04N 19/184; H04N 21/25825; H04N 7/0117; H04N 7/015
See application file for complete search history.

(56) References Cited

U.S. PATENT DOCUMENTS

| | | | |
|---|---|---|---|
| 2008/0165895 A1* | 7/2008 | Lesser | H04L 65/1059 375/316 |
| 2008/0211959 A1* | 9/2008 | Balram | G06T 3/0012 348/441 |
| 2009/0175358 A1 | 7/2009 | Gordon et al. | |
| 2009/0193473 A1 | 7/2009 | Moon et al. | |
| 2014/0289782 A1 | 9/2014 | Kawasaki | |
| 2015/0063187 A1* | 3/2015 | Lin | H04L 12/189 370/312 |
| 2015/0150070 A1* | 5/2015 | Gibbon | H04N 21/2385 725/126 |

* cited by examiner

| Resolution Label/Code | H_RES (# of Pixels) | V_RES (# of Pixels) | Pixel-RES (BPP) | Frame Raw BW (MbpS) | Uncompressed Bitstream BW (MbpS @60FPS) | HEVC Compressed Video Bitrate | |
|---|---|---|---|---|---|---|---|
| | | | | | | Minimum Sustained_Rate | Peak_Rate (@ Splice-Point) |
| VGA | 640 | 480 | 16 | 5 | 295 | 0.38 | 14.37 |
| SDTV | 720 | 480 | 16 | 6 | 332 | 0.42 | 16.17 |
| SVGA | 800 | 480 | 16 | 6 | 369 | 0.47 | 17.97 |
| SVGA | 800 | 600 | 16 | 8 | 461 | 0.59 | 22.46 |
| SVGA | 840 | 480 | 16 | 6 | 387 | 0.49 | 18.87 |
| | 854 | 480 | 16 | 7 | 394 | 0.50 | 19.18 |
| 2XVGA | 960 | 640 | 16 | 10 | 590 | 0.75 | 28.75 |
| 2XVGA | 1024 | 600 | 16 | 10 | 590 | 0.75 | 28.75 |
| XGA | 1024 | 768 | 16 | 13 | 755 | 0.96 | 36.80 |
| XGA | 1024 | 800 | 16 | 13 | 786 | 1.00 | 38.33 |
| XGA | 1024 | 800 | 16 | 13 | 786 | 1.00 | 38.33 |
| XGA+ | 1152 | 864 | 16 | 16 | 956 | 1.22 | 46.57 |
| HDTV | 1280 | 720 | 16 | 15 | 885 | 1.13 | 43.12 |
| WXGA | 1280 | 768 | 16 | 16 | 944 | 1.20 | 45.99 |
| SXGA | 1280 | 800 | 16 | 16 | 983 | 1.25 | 47.91 |
| SXGA (UVGA) | 1280 | 960 | 16 | 20 | 1180 | 1.50 | 57.49 |
| SXGA | 1280 | 1024 | 16 | 21 | 1258 | 1.60 | 61.33 |
| WXGA | 1360 | 768 | 16 | 17 | 1003 | 1.28 | 48.87 |
| WXGA | 1366 | 768 | 16 | 17 | 1007 | 1.28 | 49.08 |
| | 1400 | 1050 | 16 | 24 | 1411 | 1.80 | 68.78 |
| WSXGA | 1440 | 900 | 16 | 21 | 1244 | 1.59 | 60.64 |
| HD+ | 1600 | 900 | 16 | 23 | 1382 | 1.76 | 67.38 |
| UXGA | 1600 | 1200 | 16 | 31 | 1843 | 2.35 | 89.83 |
| WSXGA+ | 1680 | 1050 | 16 | 28 | 1693 | 2.16 | 82.53 |
| FullHDTV (4:2:0) | 1920 | 1088 | 12 | 25 | 1504 | 1.92 | 73.30 |
| FullHDTV (4:2:2) | 1920 | 1088 | 16 | 33 | 2005 | 2.56 | 97.74 |
| FullHDTV | 1920 | 1088 | 36 | 75 | 4512 | 5.75 | 219.91 |
| WUXGA | 1920 | 1200 | 36 | 83 | 4977 | 6.35 | 242.55 |
| WQXGA | 2560 | 1600 | 36 | 147 | 8847 | 11.28 | 431.20 |
| 4K-UltraHDTV | 3840 | 2160 | 48 | 398 | 23888 | 30.46 | 1164.24 |
| 4K-Full-Aperture | 4096 | 3112 | 48 | 612 | 36711 | 46.80 | 1789.19 |

FIG. 1

| Display_Video (610) | Source Display_Video (620) | 1K_Display Source / 4K_Sink Display Video (630) | WiFi Display Payload (640) |
|---|---|---|---|
| 1K & noOverlay | noDisplay | 4KUpScaled[1K] | Uncoded/ DSC_Coded[1K] |
| 1K + Overlay | noDisplay | 4KUpScaled[1K] + Remote_Rendition [4K_Overlay] | Uncoded/ DSC_Coded[1K] & Metadata[4K_Overlay] |
| 1K & noOverlay | 1K | 4KUpScaled[1K] | Uncoded/ DSC_Coded[1K] |
| 1K + Overlay | 1K + 1K_Overlay | 4KUpScaled[1K] + 1K_Overlay | DSC_Coded[1K] + 1K_Overlay] |
| 4K & noOverlay | noDisplay | HEVC-Decoded[4K] | HEVC_Coded[4K] |
| 4K + Overlay | noDisplay | HEVC_Decoded[4K] + Remote_Rendition [4K_Overlay] | HEVC_Coded[4K] & Metadata[4K_Overlay] |
| 4K & noOverlay | 1KDownScaled[4K] | HEVC-Decoded[4K] | HEVC_Coded[4K] |
| 4K + Overlay | 1KDownScaled[4K] + 1K_Overlay | HEVC_Decoded[4K] + Remote_Rendition [4K_Overlay] | HEVC_Coded[4K] & Metadata[4K_Overlay] |

FIG. 6

SYSTEM AND METHOD TO OPTIMIZE VIDEO PERFORMANCE IN WIRELESS-DOCK WITH ULTRA-HIGH DEFINITION DISPLAY

FIELD

The present application relates generally to optimizing video performance on a wireless dock, and more specifically to systems, methods, and devices for optimizing video performance in wireless-dock with an Ultra-HD display.

BACKGROUND

As wireless devices have grown more advanced, their size has shrunk, while their capabilities have increased. Accordingly, it may be desirable to be able to display information from the wireless device, such as a video that is stored locally or streamed from a broader network, on an external display, such as a computer screen, a television, or another external display. However, in some aspects, the high resolution of the video display may create bandwidth problems, as the bandwidth needed to stream lossless video over a wireless communication network to a wireless display may exceed the transmission capabilities of the connection between the wireless device and the wireless display. Accordingly, systems and methods for using raw bitstreams and lossless distributed source coding to optimize video performance in wireless-dock with ultra-high definition display may be desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include, for example, using raw bitstream and lossless distributed source coding to optimize video performance in a wireless-dock with an ultra-high definition display.

In some aspects, a method of transmitting a video stream from a transmitting device to a wireless video display is disclosed. The method includes determining a resolution of the wireless video display, determining a native resolution of the video stream, and determining a connection speed between the transmitting device and the wireless video display. The method further includes selecting a video compression format based on the resolution of the wireless video display, the native resolution of the video stream, and the connection speed between the transmitting device and the wireless video display. Finally, the method includes transmitting the video stream in the selected video compression format from the transmitting device to the wireless video display. In some aspects, selecting a video compression format includes choosing a video compression format that is one of raw video, distributed source coded video, or high-efficiency video coded video. In some aspects, the resolution of the wireless video display may be an ultra-high definition (4K) resolution. The video stream may be transmitted using any of the IEEE 802.11 formats, among other possible formats, such as the IEEE 802.11ad format. Determining a connection speed may include determining a wireless connection protocol which is being used by the transmitting device and by the wireless video display. The method may further receive user input from the wireless video display and the user input may include input from a touch screen on the wireless video display.

In one aspect, an electronic device for capturing transmitting a video stream to a wireless video display is disclosed. The device includes a processor configured to determine a resolution of the wireless video display, determine a native resolution of the video stream, and determine a connection speed between the device and the wireless video display. The processor may be further configured to select a video compression format based on the resolution of the wireless video display, the native resolution of the video stream, and the connection speed between the device and the wireless video display. The device may also include a transmitter configured to transmit the video stream in the selected video compression format from the device to the wireless video display.

In one aspect, an electronic device for capturing transmitting a video stream to a wireless video display is disclosed. The device includes means for determining a resolution of the wireless video display, means for determining a native resolution of the video stream, and means for determining a connection speed between the device and the wireless video display. The device further includes means for selecting a video compression format based on the resolution of the wireless video display, the native resolution of the video stream, and the connection speed between the device and the wireless video display and means for transmitting the video stream in the selected video compression format from the device to the wireless video display.

In one aspect, a computer program product comprising a non-transitory computer readable medium encoded thereon with instructions that when executed cause a wireless communications apparatus to perform a method of wireless communication is disclosed. The method includes determining a resolution of a wireless video display, determining a native resolution of a video stream, and determining a connection speed between the wireless communications apparatus and the wireless video display. The method further includes selecting a video compression format based on the resolution of the wireless video display, the native resolution of the video stream, and the connection speed between the wireless communications apparatus and the wireless video display and transmitting the video stream in the selected video compression format from the wireless communications apparatus to the wireless video display.

BRIEF DESCRIPTION OF THE DRAWINGS

FIG. 1 illustrates the bandwidth which is required to transmit video streams to a display in various common video formats.

FIG. 6 is an illustration of a table showing various types of video streaming technologies which may be used, based upon the source video, and the destination.

DETAILED DESCRIPTION

Figure 2:
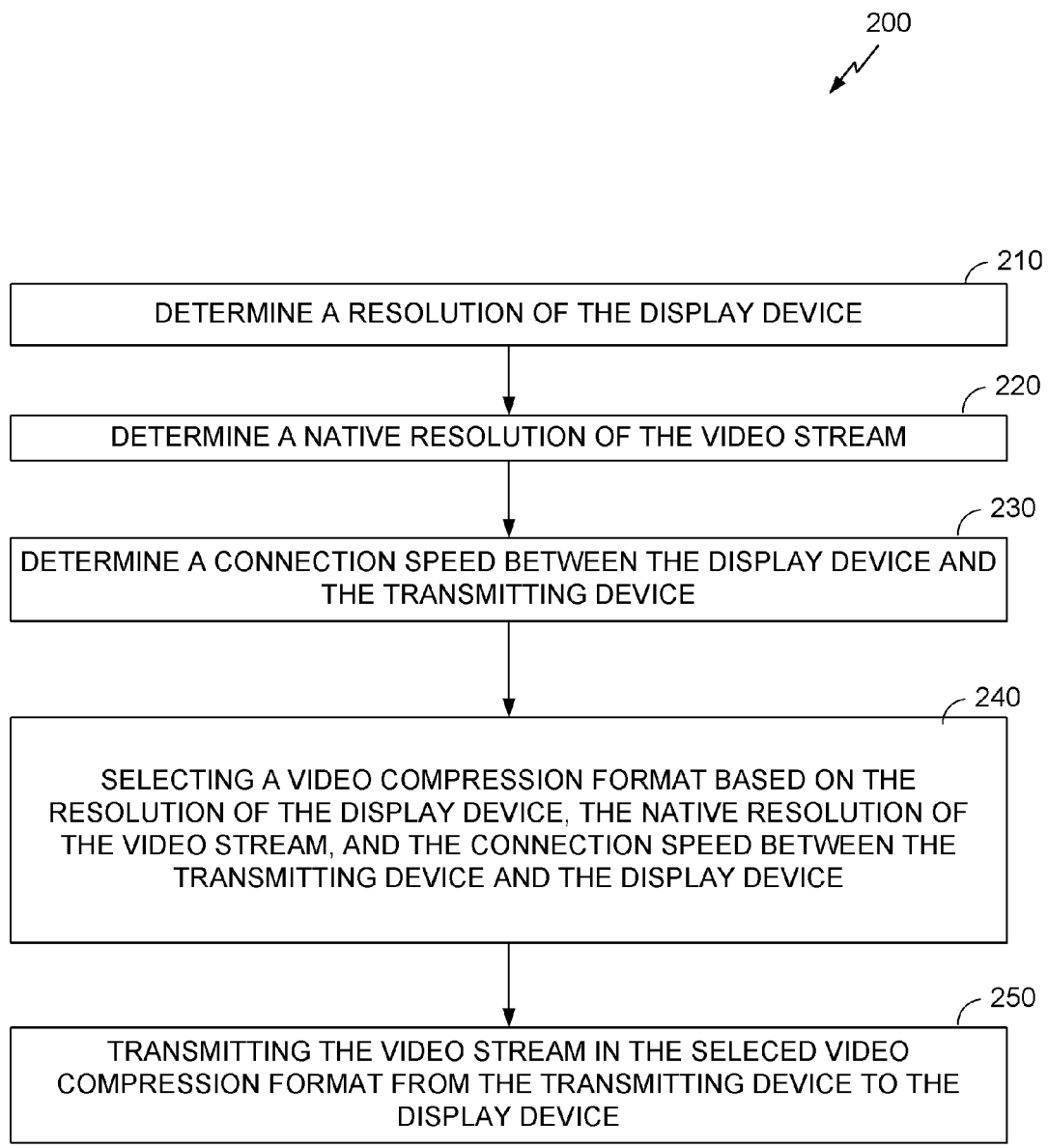
FIG. 2 illustrates an exemplary method for optimizing video performance in wireless dock.

Embodiments relate to systems, methods, and devices for optimizing video performance on a wireless dock, and more specifically to systems, methods, and devices for optimizing video performance in wireless-dock with an ultra-high definition display.

Generally, it is desirable to provide a wireless dock capability for wireless devices. For example, one advantageous feature of a wireless dock may be the ability to display the video from a wireless device with a relatively small screen, such as a cellular phone, on the screen of a large device, such as a high-definition television screen. In some aspects, displaying video from a cell phone on a television may be accomplished by using a wired connection, such as an HDMI (High-Definition Multimedia Interface) cable. However, as cell phone and other portable wireless electronics, such at laptop computers, tablets, and other devices, become smaller, it may be desired to reduce the number of ports on these devices or to eliminate at many external ports as possible in order to save space. Similarly, it may be desired to display video on a television or other screen from a wireless device without needing to connect cables between the display and the wireless device. Thus, wireless connections to display video on a television or other screen may be desired.

However, while wireless display of video may be desirable, it may also be technologically challenging. For example, the resolution and color depth of television displays may mean that video streams which are transmitted to a display require a very large bandwidth. For example, FIG. 1 illustrates the bandwidth which is required to transmit video streams to a display in various common video formats. In some aspects, the video streams may comprise streamed video from a number of different sources, such as videos streamed from local media or from a broader network such as the internet. In some aspects, video streams may also include the on-screen display of a particular device while any type of application may be used. For example, the video stream may include the screen image of a wireless device while that device is used to play games, use apps, watch video, browse the internet, read email, or any other type of function that the wireless device may be used for. For example, column 110 displays the name of a resolution, while columns 120, 130, 140, and 150 shows the horizontal pixel resolution, the vertical pixel resolution, the number of bits per pixels (which is based on the color depth of each pixel), and the size of a frame in megabits, respectively. For example, the VGA resolution may be 640 pixels by 480 pixels, with 16 bits per pixels. Multiplying these numbers, each frame may be 5 megabits. Column 160 shows the bandwidth needs for an uncompressed, 60 frames per second video stream of the given resolution and color depth, in megabits per second. Finally columns 170 and 180 illustrate minimum sustained bitrates and peak bitrates needed to transmit a compressed video stream of the given resolution, respectively. For example, an uncompressed stream of VGA video may require 295 megabits per second, while a compressed VGA stream may sustain a minimum bitrate of 0.38 megabits per second, and achieve a peak bitrate of 14.37 megabits per second.

As illustrated in FIG. 1, as the resolutions and color depths become higher, the size of an uncompressed bitstream, that is an uncompressed video stream based on MPEG standards, may become very large. For example, an uncompressed video stream of an ultra-high definition (4K) video may require a connection speed of at least 23,888 megabits per second. These extremely high bandwidth requirements may not be available using currently-available wireless communication technologies, or may be undesirable to use for other reasons. Accordingly, it may be desired, or even necessary, to use a relatively smaller amount of bandwidth to transmit video wirelessly to a display.

However, compressing video may be done in a number of ways, and each method of compressing video may have certain advantages and certain disadvantages. For example, an uncompressed bitstream may be advantageous in that this video stream format may require the least processing power for both the wireless device transmitting the video stream, and for the display receiving the video stream. Further, an uncompressed video stream will, as a result of being uncompressed, not include any loss of detail due to compression. However, as illustrated in FIG. 1, an uncompressed video stream may be significantly larger in size, and therefore require significantly higher bandwidth, than other types of video stream.

In some aspects, lossless or near-lossless compression may be used to reduce the bandwidth required for the video stream. For example, distributed source coded (DSC) video may be used. This DSC coding may reduce the size of a video stream by a factor of, for example, two, two-and-a-half, three, or four times, without reducing the quality of the video. Such coding may be lossless, or near-lossless. Typically, DSC-coding has been used in wired video applications, but it may also be extended into wireless applications, such as for use in a wireless dock. Accordingly, it may be advantageous, at times, to use DSC coding for wireless video transmission between a transmitting device such as a cell phone or a tablet and a display device. This may reduce the bandwidth needed for transmitting a video stream, without detrimentally changing the quality of the video stream. However, take more processing power on both the transmitting device to encode the video stream using DSC coding, and on the receiving device to decode the video stream.

In some aspects, using a lossy video compression format may also be beneficial. For example, a high-efficiency video coding (HEVC) scheme may be used to encode and decode the video stream from the transmitting device to the display device. For example, HEVC schemes may include formats such as the H.265/MPEG-4 AVC (Advanced Video Coding) standard. In some aspects, other lossy video compression formats, such as H.264/MPEG-4 AVC may also be used to encode the video stream. The use of these lossy compression schemes, as illustrated in columns 170 and 180, may significantly reduce the bandwidth needed to transmit video from a transmitting device to a display device. Accordingly, this may be advantageous, as it may allow wireless transmission of a higher-resolution, higher-color-depth video stream using a smaller amount of bandwidth. However, the use of a lossy compression scheme may require increased processing for both the transmitting device encoding the video stream and the display device decoding the video stream. Further, by its nature, a lossy compression scheme will result in at least some loss of sound and/or image quality in a video stream, for example, such as the appearance of artifacts and other effects. In some aspects, the appearance of artifacts and other image or sound degradation problems may be minimized by choosing appropriate lossy compression formats and by choosing appropriate compression settings for the chosen format.

FIG. 2 illustrates an exemplary method 200 for optimizing video performance in a wireless dock system. In some aspects, this method 200 may be used by a wireless device, such as a cell phone, a tablet, a portable computer, or any other type of wireless device which may wish to wirelessly display data on a display device.

At block 210, the method includes determining a resolution of the display device. For example, the method may determine that the display device is only capable of displaying a VGA resolution, or may determine that the display device is a 4K display. In some aspects, the means for determining a resolution may comprise a processor. For example, a wireless dock may transmit to a wireless device that the wireless dock is connected to a display with a certain resolution. In some aspects, this resolution may include information such as a pixel resolution, a refresh rate, and/or a color depth of the display.

At block 220, the method determines a native resolution of the video stream. This video stream may make up the video that the wireless device is playing. For example, the video stream from a wireless device may be any resolution, such as VGA, 720p, 1080p, or a native 4K stream. For example, the wireless device may be playing back a video from a local source, or may be streaming a video from an online or other source, such as streaming a video from Netflix, Youtube, Amazon Prime, or another video streaming service. Accordingly, the native resolution of this video may be known or may be determined by the wireless device. In some aspects, the means for determining a resolution may comprise a processor.

At block 230, the method determines a connection speed between the display device and the transmitting device. For example, the display device may be a television or another display device, while the transmitting device may be a wireless device that is using this method. In some aspects, determining a connection speed may involve transmitting information to or from the display device from the wireless device, and determining the available bandwidth between the two devices based on this transmission. In some aspects, determining a connection speed may include determining the type of connection protocol being used by the two devices, such as an IEEE 802.11 protocol, a Bluetooth protocol, or another protocol, and determining a connection speed based, at least in part, on a maximum theoretical or a normal practical speed of that type of connection. For example, if a certain IEEE 802.11 protocol is used, the connections speed may be determined based upon a known speed for that type of IEEE 802.11 protocol. For example, if the IEEE 802.11ad protocol is used, the connection speed of this protocol may be determined based upon the known speeds of the protocol, as well as based on a connection quality between the wireless device (transmitting device) and the wireless dock (display device). In some aspects, the means for determining a connection speed may comprise a processor. In some aspects, a transmitter or a receiver may also be used to determine the connection speed.

At block 240, the method selects a video compression format based on the resolution of the display device, the native resolution of the video stream, and the connection speed between the transmitting device and the display device. In some aspects, selecting a video compression format may comprise selecting a format from between no compression, a lossless or near-lossless compression format, and a lossy compression format. In some aspects, the lossless or near-lossless compression format may comprise a DSC format, and the lossy compression format may comprise a HEVC format, while an uncompressed video may simply be transmitted as a raw video. In some aspects, selecting a video compression format may further include determining settings for the compression format. For example, a lossy compression format may have a number of different settings which may be altered which may affect the quality of the transmitted video stream, and may also affect the bandwidth that the transmitted video stream requires. In some aspects the means for selecting may comprise a processor.

In some aspects, the method may also include selecting a resolution for the transmitted video, based on the native resolution of the video stream and the resolution of the display device. For example, the selected resolution may be the lower of the native resolution and the resolution of the display device. In some aspects, choosing a video compression format may comprise choosing the highest-quality, least-compression format that may be transmitted over the available bandwidth. For example, the values in FIG. 1 for an uncompressed video stream and for a lossy compression format for a given resolution may be compared to the available connection speed, and a video compression format may be chosen to use the highest quality possible for the given connection type. In some aspects, the transmitting device may be configured to transmit each of uncompressed video streams, video streams compressed using a lossless or near-lossless compression, or video streams compressed using a lossy compression format. Similarly, the display device may be configured to decode video in each of those formats as well.

At block 250, the method includes transmitting the video stream in the selected video compression format from the transmitting device to the display device. For example, this video may be wirelessly transmitted from a cell phone to a television, using an IEEE 802.11 protocol. In some aspects, transmitting the video stream may further comprise transmitting an indication of the chosen video compression format to the display device. In some aspects the means for transmitting may comprise a transmitter or a transceiver.

Figure 3:
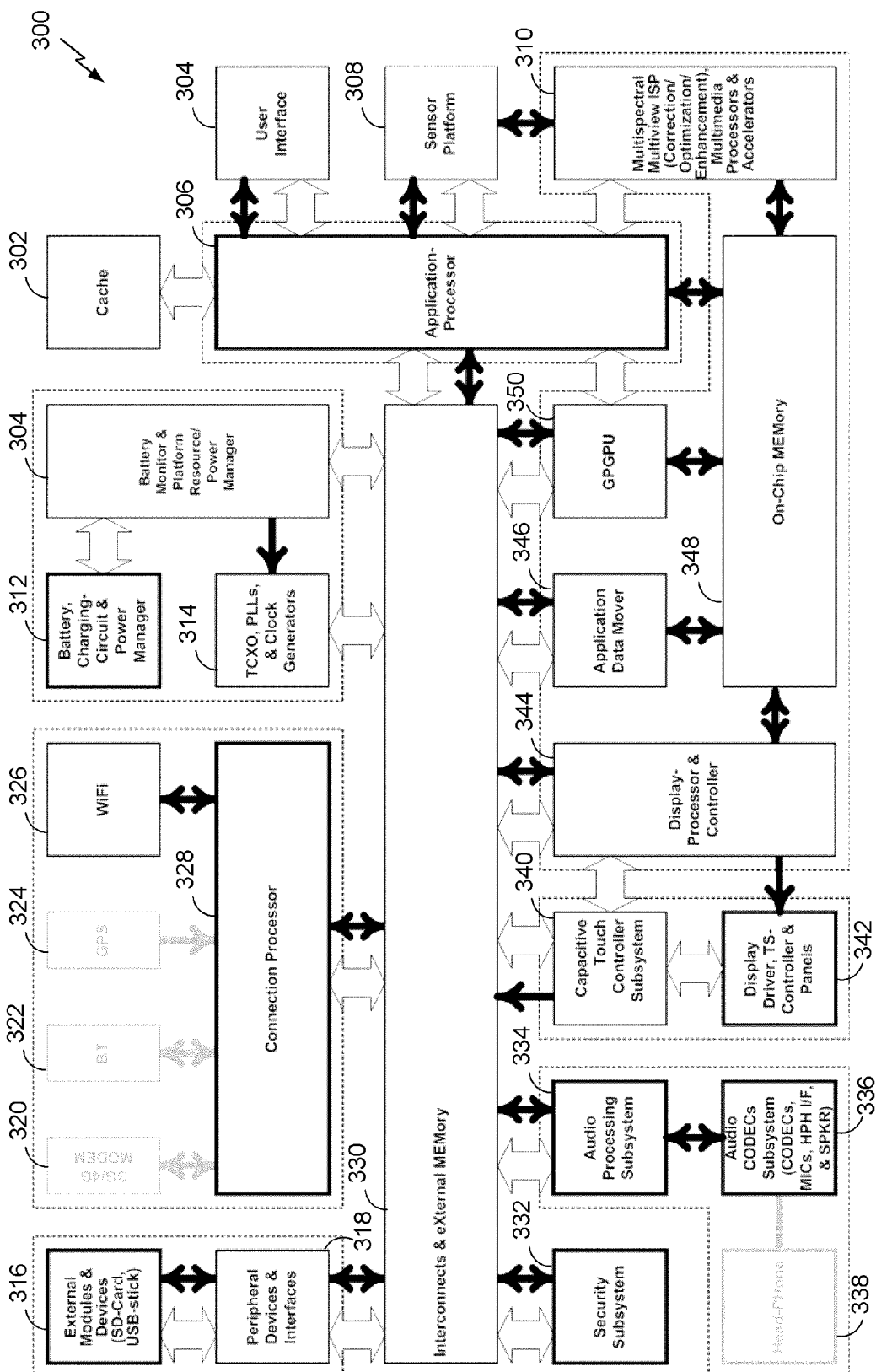
FIG. 3 is an exemplary illustration of a wireless device, such as a cellular telephone, in which aspects of the wireless dock described herein may be embodied.

FIG. 3 is an illustration of an example of a wireless device 300, such as a cellular telephone, in which aspects of the wireless dock described herein may be embodied. Wireless device 300 contains an application processor 306, which may be operably connected to a cache 302, to a user interface 304, to a sensor platform 308, to multimedia processors and accelerators 310, to on-chip memory 348, to a GPGPU 350 and to interconnects and external memory 330. The interconnects and external memory 330 may be connected to a number of peripheral devices and interfaces 318 which may connect to external modules and devices 316. The interconnects and external memory 330 may further connect to a connection processor 328, which may maintain or manage connections to a number of wireless networks, such as WiFi 326, GPS 324, Bluetooth 322, and may also have a 3G/4G modem 320 for accessing cellular networks. The interconnects and external memory 330 may further be connected to a battery monitor and power manager 304, as well as a clock generator 314. The battery monitor and power manager 304 may be operably connected to a battery charging-circuit and power manager 312. The interconnects and external memory 330 may further be connected to a display processor and controller 344, an application data mover 346, and the GPGPU 350, all of which may be connected to an on-chip memory 348 for the display portion of the wireless device 300. The interconnects and external memory 330 may further be connected to a capacitive touch controller subsystem 340, which may be connected to the display processor and controller 344 as well as to the display driver, touch screen controller and panels 342.

The interconnects and external memory 330 may be further connected to an audio processing subsystem 334, which may be connected to an audio CODECs subsystem 336, contain a number of audio codecs and may also include a speaker. This may be further connected to headphones 338, such as having a port to allow headphones to be removably connected. The interconnects and external memory 330 may be further connected to a security subsystem 332. In some aspects, as illustrated in working device 300, various components may be interconnected with each other. These connections may largely include wired connections, such as connections within the interior of wireless device 300. While certain components of the wireless device 300, such as the headphones 338, may be external, most of the components illustrated may be understood to generally be internal components of the wireless device 300. Each of the illustrated components may include a number of separate components, as desired. Each of the illustrated components may also be combined with other components to form a functional component that can perform the tasks of more than one of the illustrated components. In some aspects, certain connections which may otherwise be hard-wired connections may, when the wireless dock is enabled, instead use wireless connections including WiFi.

Figure 4:
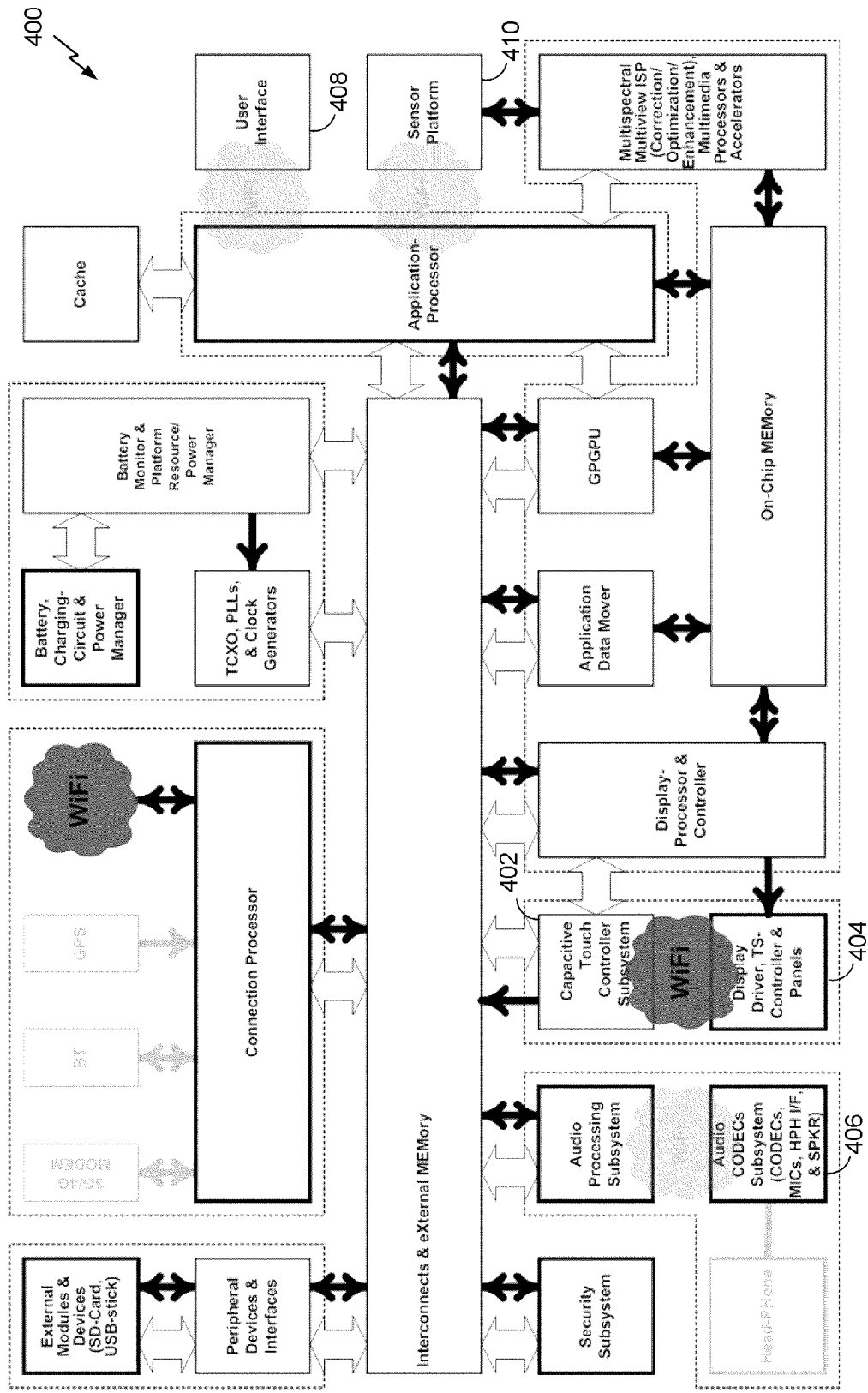
FIG. 4 is an illustration of a wireless device which uses a wireless network to connect certain components.

FIG. 4 is an illustration of an example of a wireless device 400 which uses WiFi to connect certain components. In many aspects, wireless device 400 may be similar to wireless device 300, and contain similar components which are interconnected in similar ways. For example, in wireless device 400, the capacitive touch controller subsystem 402 may be operatively connected to the display panel 404 using a WiFi connection, rather than a hard-wired connection. Certain other components, such as the audio CODECs subsystem 406, the user interface 408, and the sensor platform 410 may also be coupled to wireless device 400 via WiFi or other wireless connection rather than a wired connection as well. That is, in this mode, the wireless device 400 may be wirelessly connected to an external display, which may include a flat panel display, speakers, and in some aspects, may also include a touch or other user interface. Accordingly, those connections may be based on WiFi, or may be based on another wireless communications protocol, such as a Bluetooth connection or a cellular data connection. In some aspects, it may be beneficial to use a connection that has the highest bandwidth to connect an external display to the wireless device 400. For example, in same aspects, it may be desirable to use a WiFi connection based on an IEEE 802.11 protocol, rather than a cellular data connection, as a WiFi connection may allow faster data communications between the wireless device 400 and an external display.

Figure 5:
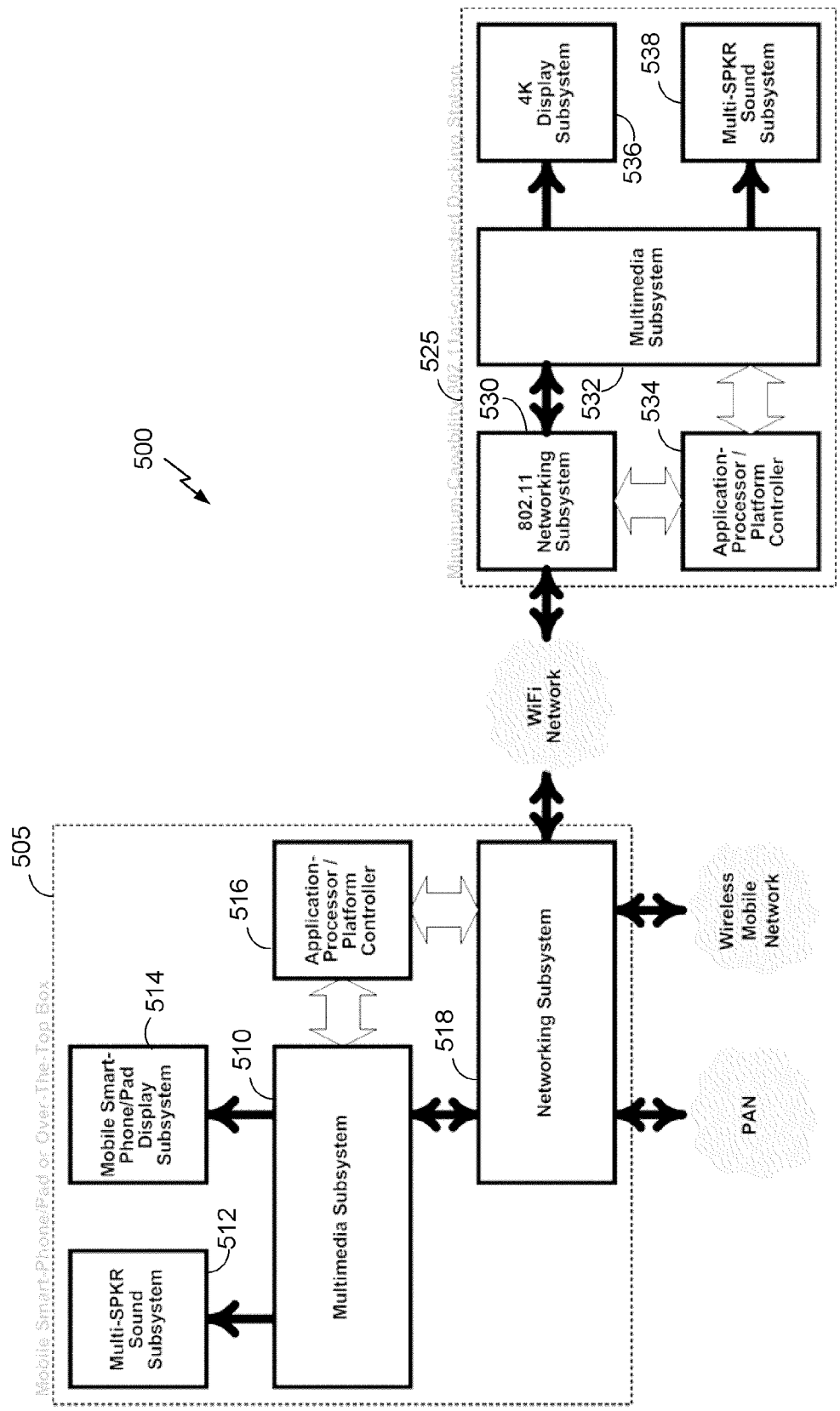
FIG. 5 is an illustration of a wireless network connection between a wireless device and a docking station.

FIG. 5 is an illustration of an example of a WiFi connection between a wireless device 505 and a docking station 525. In some aspects, the wireless device may include a mobile smartphone, a computing pad, an over-the-top box, or another wireless device. In some aspects, the wireless device may include a multimedia subsystem 510, which may be operably connected to a multi-speaker sound subsystem 512, a mobile smartphone/pad display subsystem 514, an application processor/platform controller 516, and a networking subsystem 518. This networking subsystem 518 may be configured to connect to one or more of wireless mobile networks, personal area networks, and WiFi networks.

The docking station 525 may include an IEEE 802.11 networking subsystem 530, configured to connect to a WiFi network. The docking station 525 may further include an application processor/platform controller 534, operably connected to a multimedia subsystem 532. The docking station 525 may include a display system 536, such as a display system 536 capable of supporting the 4K standard, as well as a multi-speaker sound system 538. For example, in some aspects, the docking station 525 may be a television or other display with WiFi capabilities. The docking station 525 may also be a device that may be coupled to an external display, such as a set-top box or other system, such that it may connect to an ordinary 4K or other external display. In some aspects, the docking station 525 may be configured to connect to the mobile smartphone or other device over the WiFi network, and to receive video and/or audio from the mobile smartphone which may be played on the display and the sound system of the docking station 525. In some aspects, the docking station 525 may also be configured to receive input from a user, and these user inputs, such as touch screen gestures, may be transmitted back to the mobile smartphone using the WiFi network.

FIG. 6 is an illustration of a table 600 showing various types of video streaming technologies which may be used, based upon the source video, and the destination. This illustration 600 shows various techniques that may be used to transmit video to a display that is not a 4K display, such as a 1K (high-definition) display.

In table 600, the Display Video column 610 lists the type of video that is to be displayed on the display device which is connected via the wireless dock. This video may either have an overlay or may not have an overlay, and could be in either 1K (high-definition) or 4K resolution. The Source display video column 620 lists the type of video that is being used as a source video on the wireless device. The 4K Sink Display Video column 630 illustrates the coding for the video which must be done on the wireless dock itself. For example, if the video needs to be upscaled, or decoded from an HEVC format, this will be done on by the wireless dock. Depending on the type of video that is being displayed, a number of different encodings may be used. Because this display is a 4K display, the overlay, when one is present, much be rendered in both the resolution of the WiFi display (here, 1K), and the resolution of the sink display (here, 4K). The WiFi display payload column 640 illustrates the encoding which may be used for the WiFi display. Depending upon the video, this video stream may be uncoded, DSC-coded, or HEVC-coded. The choice of coding may be made in such a way as to maximize the use of the transmission speed of the WiFi connection, and therefore to provide as high quality of video as possible to the wirelessly docked device.

Figure 7:
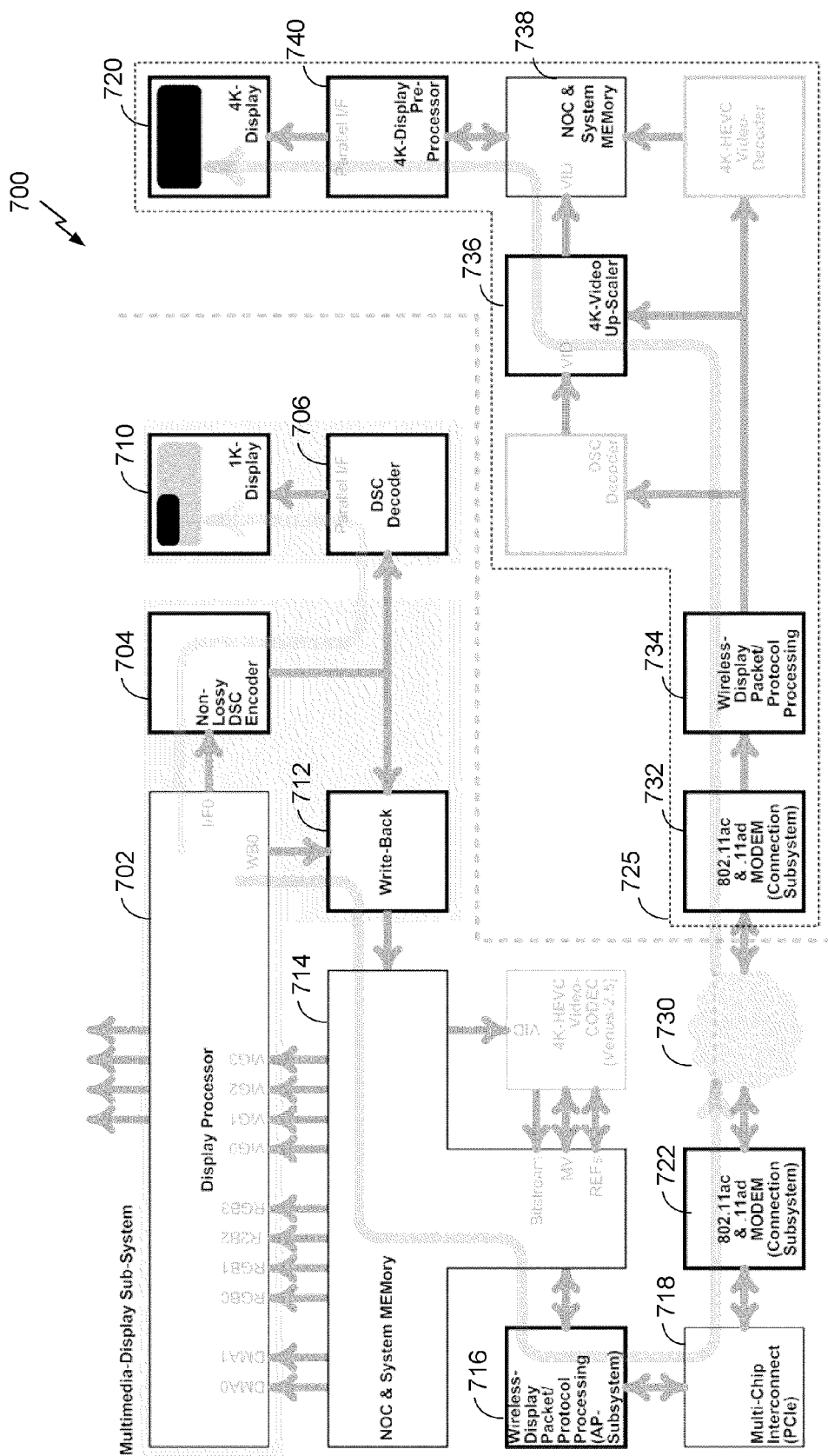
FIG. 7 is a schematic that illustrates of the path through a number of components that raw or uncoded video takes to transfer either to an ultra-high definition device connected via a network.

FIG. 7 is an illustration of a schematic 700 of an example of a path through a number of components that raw or uncoded video takes to transfer either to a 4K device 720 connected via a network 730. As illustrated, a fast WiFi standard (for example, IEEE 802.11ad) may be capable of transferring 1K video in either RAW or DSC-coded formats. Accordingly, for such video resolution, lossy HEVC coding may not be required. The path for RAW video from the display processor 702 to the 4K display may include transferring the video from the display processor 702 to the write-back 712. The video may then be transferred to the system memory 714, to a wireless display packet/protocol processing (AP subsystem) 716, to a multi-chip interconnect (PCIe) 718, and to a modem 722. The modem 722 may be configured to format transmit the video using, for example an IEEE 802.11ac or 802.11ad standard to the network 730. From the network, the video stream may be received by a modem 732 inside the wireless dock 725. The video stream may be decoded using a wireless display packet/protocol processing system 734, and may be upscaled to 4K resolution using a 4K-video up-scaler 736. From there, the video stream may be transmitted to the system memory 738, to the 4K display pre-processor 740, and finally to the 4K display.

Figure 8:
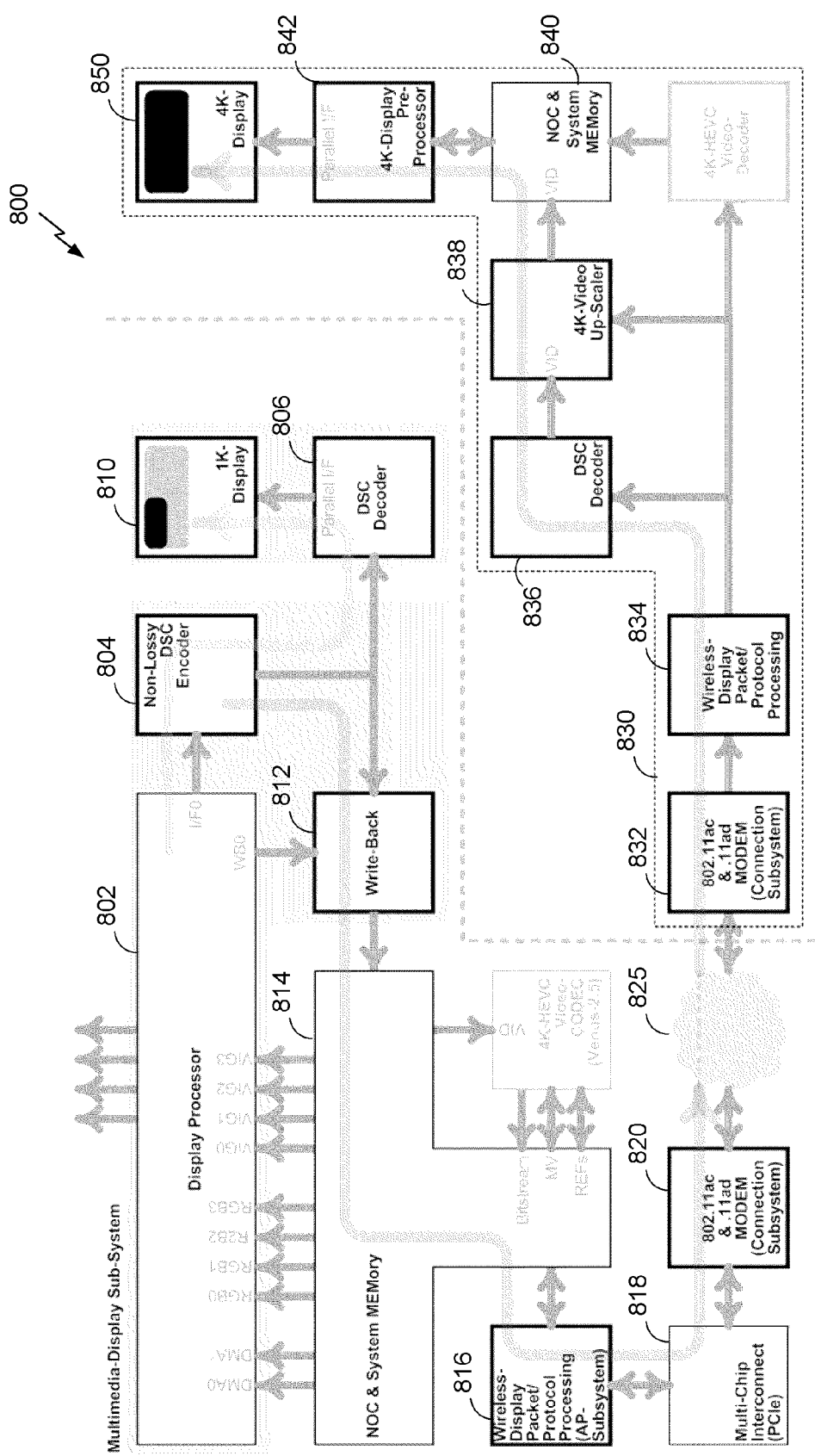
FIG. 8 is an illustration of a schematic that shows a path through a number of components of both a wireless device and a wireless dock system that distributed source coding video may take to reach an ultra-high definition device.

FIG. 8 is an illustration of a schematic 800 that shows an example of a path through a number of components of both a wireless device and a wireless dock system that DSC coded video may take to reach a 4K device 850. The video stream may begin at a display processor 802, where it is then coded by a non-lossy DSC encoder 804 into a DSC video stream. This stream may then pass through the write-back 812, through the system memory 814, and be formatted into packets in the wireless display packet/protocol processing subsystem (AP-subsystem) 816. These packets may travel from the multi-chip interconnect (PCIe) 818 to the modem 820. This modem 820 may be capable of transmitting in, for example an IEEE 802.11ac or 802.11ad format. The modem 820 may then transmit the packets containing the video stream through the network 825 to a modem 832 in the wireless dock 830. This modem 832 may then transmit the packets to a wireless display packet/protocol processing system 834 to combine the packets into a DSC-encoded video stream. This video stream may be decoded by a DSC decoder 836, and then upscaled to a 4K video by a 4K-video up-scaler 838. From there, the video stream may be passed to the system memory 840, to the 4K display pre-processor 842, and finally to the 4K display 850.

Figure 9:
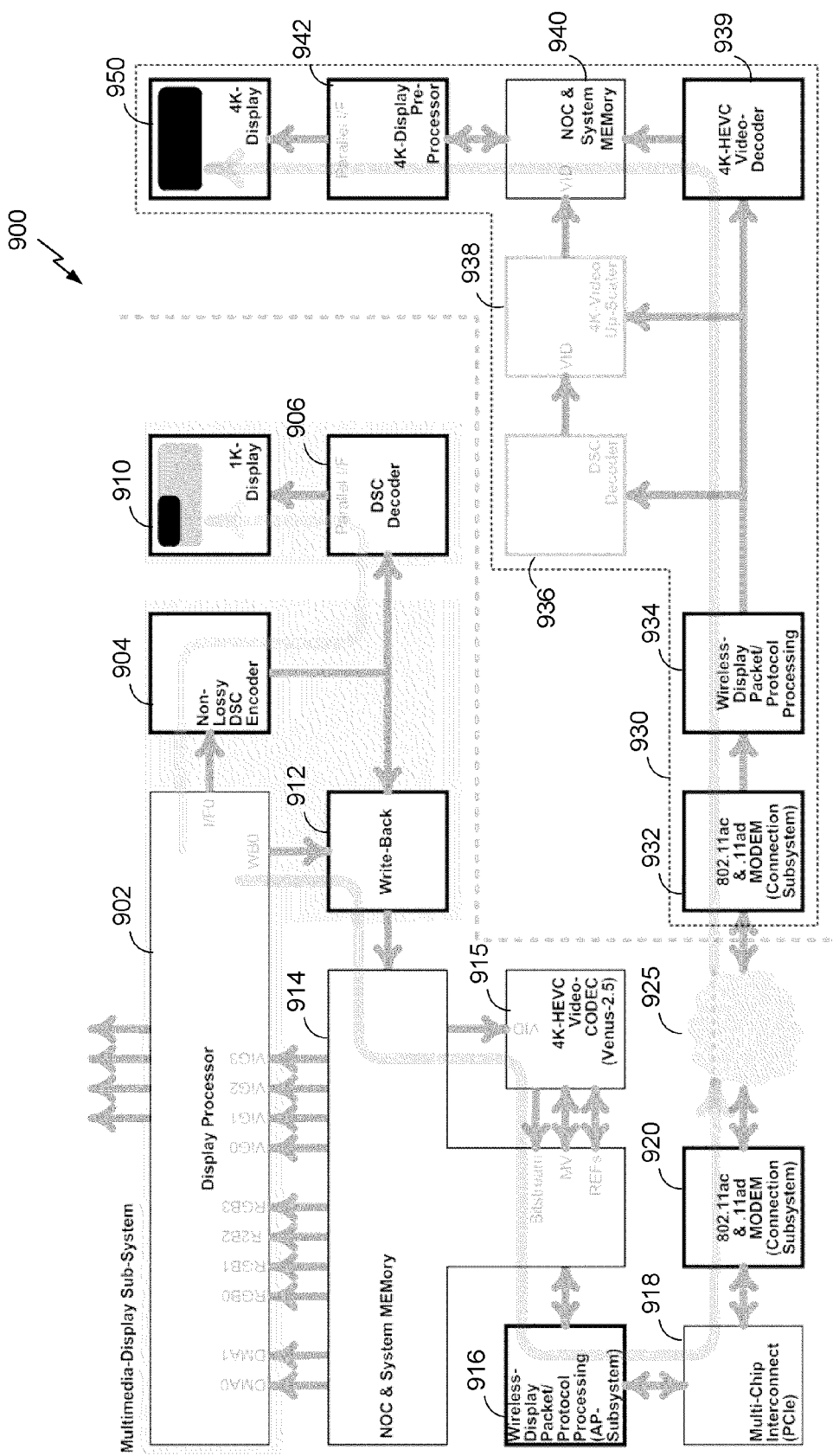
FIG. 9 is an illustration of a schematic that shows path through a number of components of both a wireless device and a wireless dock system that high-efficiency video coding video may take to reach an ultra-high definition device.

FIG. 9 is an illustration of a schematic 900 that shows an example of a path through a number of components of both a wireless device and a wireless dock system that HEVC coded video may take to reach a 4K device 950. The video stream may begin at a display processor 902, where it is then passed through the write-back 912, through the system memory 914, and coded by the 4K-HEVC video codec 915, and then formatted into packets in the wireless display packet/protocol processing subsystem (AP-subsystem) 916. These packets may travel from the multi-chip interconnect (PCIe) 918 to the modem 920. This modem 920 may be capable of transmitting in, for example an IEEE 802.11ac or 802.11ad format. The modem 920 may then transmit the packets containing the video stream through the network 925 to a modem 932 in the wireless dock 930. This modem 932 may then transmit the packets to a wireless display packet/protocol processing system 934 to combine the packets into a HEVC-encoded video stream. This video stream may be decoded by a 4K-HEVC video decoder 939, which may convert the HEVC-formatted video into a raw video stream, or other format. From there, the video stream may be passed to the system memory 940, to the 4K display pre-processor 942, and finally to the 4K display 950.

Figure 10:
FIG. 10 illustrates a table that shows video coding adaptation strategies for smart-phones or pads with an ultra-high definition display, connected to an ultra-high definition wireless dock.

FIG. 10 illustrates a table that shows 1000 video coding adaptation strategies for smart-phones or pads with an integrated 4K display, connected to a 4K wireless dock. In this illustration 1000, the display video 1010 lists the type of video that will be displayed on the display device that is connected via the wireless dock, such as whether an overlay will be used (such as the overlay of a keyboard), and whether the resolution of the video is 1K or 4K. The Source display video column 1020 lists the type of video that is being used as a source video on the wireless device. The 4K Sink Display Video column 1030 illustrates the steps that must be taken on the wireless dock to decode the received video and overlay, while the WiFi display payload 1040 provides the type of video that may be transmitted using WiFi. For example, for 4K video with an overlay, the stream may be encoded using HEVC, including both the video and the overlay. On the wireless dock, this stream will be decoded using an HEVC decoder, and displayed on the 4K display of the wireless dock.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with the figures may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of transmitting a video stream from a transmitting device to a wireless video display, the method comprising:
    determining, by the transmitting device, a resolution of the wireless video display;
    determining, by the transmitting device, a native resolution of the video stream;
    determining a wireless connection protocol being used by the transmitting device and by the wireless video display, the protocol having a known connection speed;
    determining, by the transmitting device, a connection quality between the transmitting device and the wireless video display;
    determining available bandwidth between the transmitting device and the wireless video display based on transmitting information between the transmitting device and the wireless video display;
    determining, by the transmitting device, a connection speed between the transmitting device and the wireless video display, the determination of the connection speed based at least in part on (i) the connection quality, (ii) the known connection speed of the protocol, and (iii) the available bandwidth;
    selecting, by the transmitting device, a video compression format based on the resolution of the wireless video display, the native resolution of the video stream, and the connection speed between the transmitting device and the wireless video display; and
    transmitting, by the transmitting device, the video stream in the selected video compression format from the transmitting device to the wireless video display.

2. The method of claim 1, wherein selecting a video compression format comprises choosing a video compression format that is one of raw video, distributed source coded video, or high-efficiency video coded video.

3. The method of claim 1, wherein the resolution of the wireless video display comprises a 4K resolution.

4. The method of claim 1, wherein transmitting the video stream comprises transmitting the video stream using an IEEE 802.11 format.

5. The method of claim 4, wherein transmitting the video stream comprises transmitting the video stream using an IEEE 802.11ad format.

6. The method of claim 1, wherein determining a connection speed comprises determining a wireless connection protocol which is being used by the transmitting device.

7. The method of claim 6, wherein determining a connection speed further comprises determining a wireless connection protocol which is being used by the wireless video display.

8. The method of claim 1, further comprising receiving user input from the wireless video display, wherein the user input comprises input from a touch screen on the wireless video display.

9. An electronic device for transmitting a video stream to a wireless video display, the device comprising:
   a processor configured to:
      determine a resolution of the wireless video display;
      determine a native resolution of the video stream;
      determine a wireless connection protocol being used by the transmitting device and by the wireless video display, the protocol having a known connection speed;
      determine a connection quality between the transmitting device and the wireless video display;
      determine available bandwidth between the transmitting device and the wireless video display based on transmitting information between the transmitting device and the wireless video display;
      determine a connection speed between the device and the wireless video display, the determination of the connection speed based at least in part on (i) the connection quality, (ii) the known connection speed of the protocol, and (iii) the available bandwidth;
      select a video compression format based on the resolution of the wireless video display, the native resolution of the video stream, and the connection speed between the device and the wireless video display; and
   a transmitter configured to transmit the video stream in the selected video compression format from the device to the wireless video display.

10. The device of claim 9, wherein selecting a video compression format comprises choosing a video compression format that is one of raw video, distributed source coded video, and high-efficiency video coded video.

11. The device of claim 9, wherein the resolution of the wireless video display comprises a 4K resolution.

12. The device of claim 9, wherein transmitting the video stream comprises transmitting the video stream using an IEEE 802.11 format.

13. The device of claim 12, wherein transmitting the video stream comprises transmitting the video stream using an IEEE 802.11ad format.

14. The device of claim 9, wherein determining a connection speed comprises determining a wireless connection protocol which is being used by the device.

15. The device of claim 14, wherein determining a connection speed comprises determining a wireless connection protocol which is being used by the wireless video display.

16. The device of claim 9, further comprising a receiver configured to receive user input from the wireless video display, wherein user input comprises input from a touch screen on the wireless video display.

17. An electronic device for transmitting a video stream to a wireless video display, the device comprising:
   means for determining a resolution of the wireless video display;
   means for determining a native resolution of the video stream;
   means for determining a wireless connection protocol being used by the device and by the wireless video display, the protocol having a known connection speed;
   means for determining a connection quality between the device and the wireless video display;
   means for determining available bandwidth between the transmitting device and the wireless video display based on transmitting information between the transmitting device and the wireless video display;
   means for determining a connection speed between the device and the wireless video display, the determination of the connection speed based at least in part on (i) the connection quality, (ii) the known connection speed of the protocol, and (iii) the available bandwidth;
   means for selecting a video compression format based on the resolution of the wireless video display, the native resolution of the video stream, and the connection speed between the device and the wireless video display; and
   means for transmitting the video stream in the selected video compression format from the device to the wireless video display.

18. The device of claim 17, wherein means for selecting a video compression format comprises means for choosing a video compression format that is one of raw video, distributed source coded video, and high-efficiency video coded video.

19. The device of claim 17, wherein the resolution of the wireless video display comprises a 4K resolution.

20. The device of claim 17, wherein the means for transmitting the video stream comprises means for transmitting the video stream using an IEEE 802.11 format.

21. The device of claim 20, wherein the means for transmitting the video stream comprises means for transmitting the video stream using an IEEE 802.1 lad format.

22. The device of claim 17, wherein the means for determining a connection speed comprises means for determining a wireless connection protocol which is being used by the device and by the wireless video display.

23. The device of claim 17, further comprising means for receiving user input from the wireless video display, wherein user input comprises input from a touch screen on the wireless video display.

24. A computer program product comprising a non-transitory computer readable medium encoded thereon with instructions that when executed cause a wireless communications apparatus to perform a method of transmitting a video stream, said method comprising:
   determining a resolution of a wireless video display;
   determining a native resolution of a video stream;
   determining a wireless connection protocol being used by a transmitting device and by a wireless video display, the protocol having a known connection speed;
   determining a connection quality between the transmitting device and the wireless video display;
   determining available bandwidth between the transmitting device and the wireless video display based on transmitting information between the transmitting device and the wireless video display;

determining a connection speed between the wireless communications apparatus and the wireless video display, the determination of the connection speed based at least in part on the connection quality, (ii) the known connection speed of the protocol, and (iii) the available bandwidth;

selecting a video compression format based on the resolution of the wireless video display, the native resolution of the video stream, and the connection speed between the wireless communications apparatus and the wireless video display; and transmitting the video stream in the selected video compression format from the wireless communications apparatus to the wireless video display.

25. The computer program product of claim 24, wherein selecting a video compression format comprises choosing a video compression format that is one of raw video, distributed source coded video, and high-efficiency video coded video.

26. The computer program product of claim 24, wherein the resolution of the wireless video display comprises a 4K resolution.

27. The computer program product of claim 25, wherein transmitting the video stream comprises transmitting the video stream using an IEEE 802.11 format.

28. The computer program product of claim 27, wherein transmitting the video stream comprises transmitting the video stream using an IEEE 802.11ad format.

29. The computer program product of claim 25, wherein determining a connection speed comprises determining a wireless connection protocol which is being used by the wireless communications apparatus and by the wireless video display.

30. The computer program product of claim 25, further comprising receiving user input from the wireless video display, wherein user input comprises input from a touch screen on the wireless video display.

\* \* \* \* \*